United States Patent [19]
Bratschun et al.

[11] Patent Number: 5,136,135
[45] Date of Patent: Aug. 4, 1992

[54] WELDING DESIGN FOR PLATED, DISSIMILAR METALS

[75] Inventors: William R. Bratschun, La Grange; John L. Leicht, Hawthorn Woods, both of Ill.

[73] Assignee: Motorola, Inc., Schaumburg, Ill.

[21] Appl. No.: 587,206

[22] Filed: Sep. 24, 1990

[51] Int. Cl.⁵ .................................................. B23K 11/20
[52] U.S. Cl. ........................................................ 219/118
[58] Field of Search ................ 219/118, 91.2, 92, 93, 219/85.22, 85.1; 228/180.2; 310/239

[56] References Cited

U.S. PATENT DOCUMENTS

| | | | |
|---|---|---|---|
| 2,883,518 | 4/1959 | Zabka et al. | 219/118 |
| 2,937,262 | 5/1960 | Baxter | 219/118 |
| 4,203,020 | 5/1980 | Armbruster et al. | 219/118 |
| 4,273,983 | 6/1981 | Ogawa et al. | 219/118 |
| 4,480,166 | 10/1984 | Leech | 219/118 |
| 4,494,029 | 1/1985 | Hoshino et al. | 310/239 |
| 4,591,687 | 5/1986 | Urech | 219/118 |
| 4,995,551 | 2/1991 | MacKay | 228/180.2 |

FOREIGN PATENT DOCUMENTS

| | | | |
|---|---|---|---|
| 2233128 | 1/1975 | France | 219/85.22 |
| 62-77183 | 4/1987 | Japan | 219/85.22 |

OTHER PUBLICATIONS

The Welding Journal, Mar. 1949, pp. 243–246, "Silver Alloy Brazing Beryllium–Copper Alloys".

*Primary Examiner*—Geoffrey S. Evans
*Attorney, Agent, or Firm*—Jon Christensen

[57] ABSTRACT

A method of welding two dissimilar metals of substantially different melting temperatures by passing an electric current through an interface created by biasing a projection located on the higher melting point metal into intimate contact with a surface located on the lower melting point material. The electrical current substantially liquifies a portion of only the second metal so that the projection is not substantially deformed by the welding operation.

9 Claims, 2 Drawing Sheets

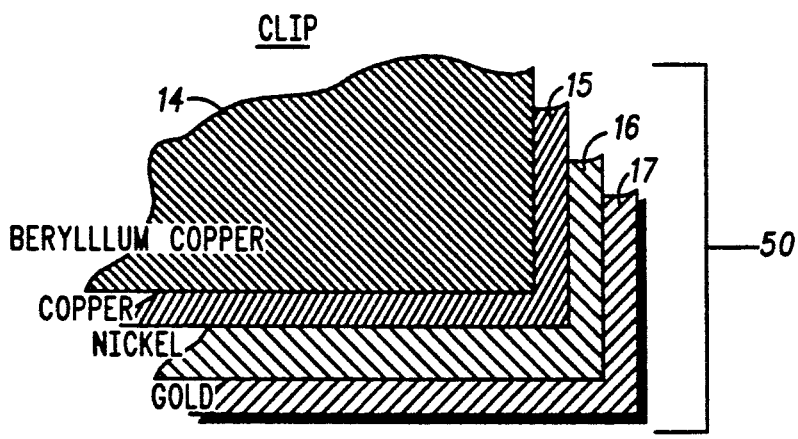
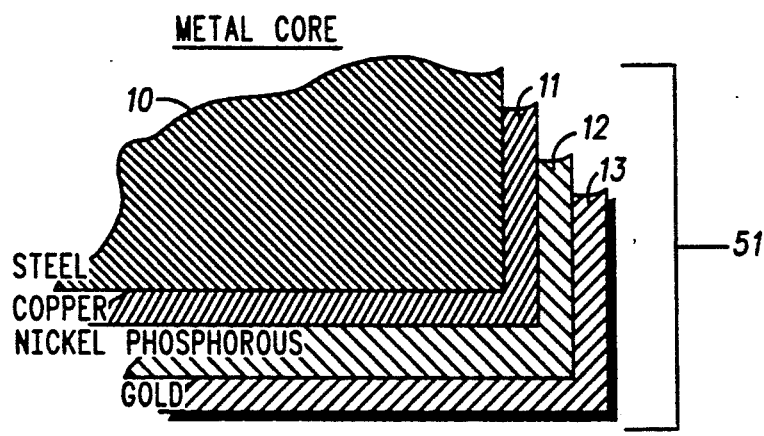
FIG.1
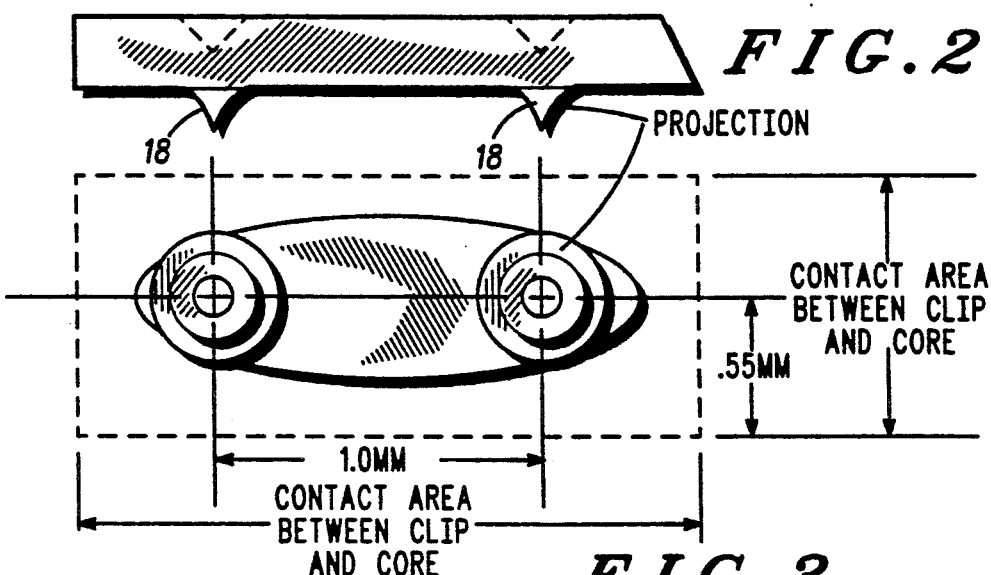
FIG.2
FIG.3

WELDING DESIGN FOR PLATED, DISSIMILAR METALS

TECHNICAL FIELD

The invention relates generally to the field of resistance welding and more specifically to projection welding.

BACKGROUND

Projection welding is well known in the art. Typically a projection is created on the first of two metal objects of similar composition by milling, stamping, or otherwise. The first metal object is biased into contact with the second metal object and an electric current is passed between the two metal objects. The electric current is passed from a point on the projection on the first of the two metal objects into a contact point on the second metal object until such time as the metal comprising the projection and the contact point liquefy. The current is interrupted, the metals cool and the two metal objects remain jointed by solidified metal.

The projection point on the first metal object serves two purposes. The first purpose served is that of a convenient contact point and method of localizing the electric current to a desired location. Since the projection is created in anticipation of joining the two objects the projection may be located at will by a designer.

The projection also serves a second purpose in controlling the flow of welding current. The flow of low frequency electric current in metals is generally regarded as a mass flow phenomenon. The greater the cross-sectional area of current flow in any given situation, the lower the current density. The lower the current density the less localized heating occurs relative to the electric current.

In projection welding an electrical path is presented comprising a projection on the first metal and a contact point on a plane located on the second metal. The projection presents a relatively small cross-sectional area to the flow of electric current. The small cross-sectional current path between the two metals provides a circuit path of relatively high resistance between the objects. Because of the higher resistance within the projection-contact interface the generation of heat created by the weld cycle is concentrated at the interface.

During a projection weld, heating occurs within the projection and contact point and the metals within each liquefy. The projection to a substantial degree collapses. To maintain current flow and complete the weld the two objects must be biased together to maintain contact during liquefaction. As the base metal surrounding the projection come into contact with the second metal the weld cycle is interrupted. The metals mix and subsequently re-solidify resulting in a continuous metallic connection between the first and second metals.

The power source used in projection welding varies according to the application. Where the thickness of each metal is significant, a transformer may be connected in series with the interface. Where the metals are thin adequate power may be provided through the discharge of a capacitor.

Power control in projection welding is offered through the use of timers and through the presence of internal impedance within the welding circuit. To offer sufficient power to the weld site the internal impedance of the power supply and external weld circuit must be low relative to the impedance of the interface between the two metals to be welded. If, on the other hand, the impedance of the power supply and external weld circuit is too low then excessive power is delivered to the weld site and blow-out at the weld interface may occur.

In most cases excessive current are prevented by matching the weld circuit to the weld interface. Thicker materials require larger transformers with lower impedances. Matching the weld circuit to the interface allows for a controlled rate of rise of temperature at the weld interface and a controlled zone of liquefaction. A timer is used to terminate the weld cycle at an appropriate instant when the volume of liquefaction is adequate.

As previously mentioned projection welding has been typically limited to similar metals. Similar metals offer the greatest opportunity for mixing of metals within the zone of liquefaction at a weld point and coincidentally with weld strength. Because of the economy and strength of projection welding a need exits for a method of applying projection welding technology to the joining of dissimilar materials. Efforts, in the prior art, to use projection welding of dissimilar metals have been only partially successful, producing results of widely varying weld strengths.

SUMMARY OF THE INVENTION

Pursuant to one embodiment of the invention a method of welding a first metal to a second metal is disclosed wherein the first metal has a higher melting temperature than the second metal and the first metal has a projection disposed thereon. The method involves biasing the projection on the first metal into intimate contact with the second metal to create a weld interface, passing an electric current through the interface thereby liquifying a portion of the second metal, and forcing the projection on the first metal into the second metal without substantial deformation of the projection followed by subsequent cooling and solidification of the metals.

Initially the only contact point between the two metals exists between the tips of the projections and a corresponding point on the second metal. Because of the limited contact area the welding current is initially concentrated into a relatively small area.

As the welding current passes through the weld interface the temperature increases until the second metal beings to melt at the interface. Because of the pressure biasing the two metals together the projection on the first metal begins to penetrate the second metal. As penetration proceeds the cross-sectional area through which current flows increases as the point of contact changes from the tip of the projection to the middle to the base of the projection. As penetration progresses and nears the base of the projection molten material displaced from the second metal accumulates around the penetrating projection and makes contact with the base metal surrounding the projection on the first metal.

The power supply used in the embodiment comprises a capacitor charged to an initial value. Use of a capacitor provides a fixed total value of energy available for the weld. Use of a capacitor also provides for rapid initial heating while the capacitor is charged to an initial voltage and the cross-sectional area of current flow is smallest. As the capacitor discharges and the cross-section area of contact increased the rate of heating decreases thereby reducing the chance of blow-out.

BRIEF DESCRIPTION OF THE DRAWINGS

FIG. 1 comprises a perspective view of a first and a second metal to be welded and the platings located thereon.

FIG. 2 comprises a perspective view of projections located on the first metal.

FIG. 3 comprises a perspective view of two projections and the resultant weld area of two projections.

BEST MODE FOR CARRYING OUT THE INVENTION

Figure 4:
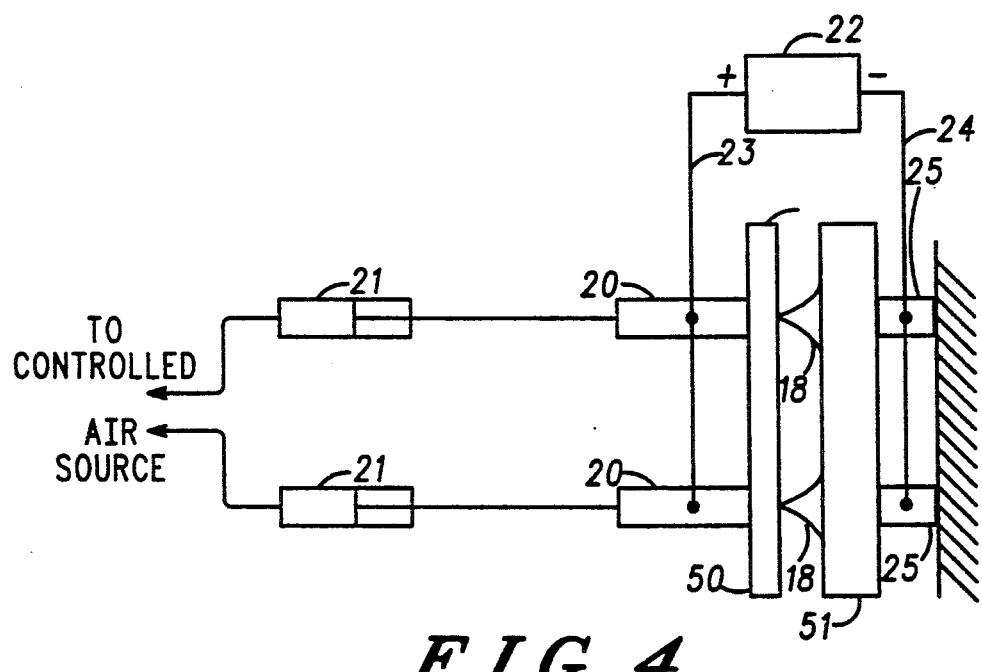
FIG. 4 comprises a block diagram of the weld circuit of the invention.

Pursuant to one embodiment of the invention a plated beryllium copper electrical clip (50, FIG. 1) is welded to a plated steel substrate (51). The platings are performed as a separate operation to enhance the performance of the base metals for use in a unrelated electrical circuit. The plating composition is as substantially shown in FIG. 1. Shown in FIG. 1 is a 0.01 inch (0.0039 cm.) thick steel plate (10) having a melting temperature of 1538° C. plated with copper (11) having a melting temperature of 1083° C. to a thickness of 0.0003 inch (0.00012 cm.) followed by a coating of electroless nickel phosphorus (12) having a melting temperature of 1010° C. to a thickness of 0.00015 inch (0.000059 cm.) and a final gold plating having a melting temperature of 1063° C. to 0.00001 inch (0.0000039 cm.).

The beryllium copper electrical clip (14) having a thickness of 0.005 inch (0.002 cm.) and a melting temperature of 980° C. is similarly plated with copper (15) having a melting temperature of 1083° C. to a depth of 0.00002 inch (0.0000079 cm.) nickel (16) having a melting temperature of 1455° C to a depth of 0.000075 inch (0.00003 cm.), and gold having a melting temperature of 1063° C. to a depth of 0.00004 inch (0.000016 cm.).

Projections are created on the steel substrate through a stamping process either before or after plating. In one embodiment (FIG. 2) two projections (18) are created on the steel substrate (51). Each projection (18) has a diameter of substantially 0.023 inch (0.0091 cm.) and a height of 0.005 inch (0.002 cm.). Use of two projections (FIG. 3) in close proximity creates a welded area substantially larger than the total area of two separate welds.

To facilitate the welding process the steel substrate and clip are placed in an alignment fixture through which alignment of the clip and substrate are maintained during the welding process. As shown (FIG. 4) the clip (50) is held in contact and proper alignment with the substrate (51) through the use of clamping electrodes (20). The clamping electrodes are, in turn, connected to air cylinders (21) providing a constant force biasing the clip (50) and the projection (18) on the substrate (51) into intimate contact.

Connected to the clamping electrodes (20) is a power source (22) providing a welding current between the clip (50) and the substrate (51). The power source (22) used in this embodiment is a Unitek Model 250DG resistance welding power supply (For an operational description of the Unitek Model 250DP see Unitek publication #31-202-03 published May 1988.) The welding power is set at typically 30-40% with a weld duration of substantially 7.8 milliseconds.

Upon activation of the welding cycle through activation of a switch (not shown) the power source (22) provides a welding current across the connecting conductor (23), the electrodes (20), the beryllium copper-clip (50), an interface between the beryllium copper clip (50) and the steel substrate (51), the steel substrate (51), the base electrodes (25) and back to the power source (22) through a return conductor (24). Since the largest relative resistance within the welding circuit is across the interface between the clip (50) and the projections (18) the majority of the energy provided by the power source (22) is dissipated with the interface.

As the temperature of the interface increases the temperature at which beryllium copper melts is reached. Because of the biasing of the projection (18) towards the clip (50), the projection is forced into the clip (18). Since the beryllium copper (14) melts at 980° C. and the superimposed platings of copper (15), nickel (16), and gold (17) melt at higher temperatures the projections penetrate and displace the platings on the beryllium copper clip (50) before entering the beryllium copper (14). The nickel (16) on the beryllium copper clip (50) does not melt but is physically displaced and forced to follow the contour of the projections (18) in the form of a discontinuous matrix with the beryllium copper (14). Melting of the remaining platings, copper (15) and gold (17) on the beryllium copper clip (50) and gold (13), electroless nickel phosphorus (12) and copper (11) on the projection (18) substantially occurs before completion of the weld cycle.

As the projection (18) enters the clip (50) the cross-sectional area of the current path increases. As the cross-sectional area increases the current density deceases. As the projection (18) penetrates the beryllium copper clip (50) molten material displaced from the beryllium copper clip (50) accumulates around the projection (18). As the projection (18) fully penetrates the beryllium copper clip (50) the molten material from the beryllium copper clip (50) first makes contact with the steel substrate (51) enlarging the conduction path and the final weld area.

Since the final welding current rate is a function of resistance in the weld circuit, controls may be added to prevent excessive current and resultant blow-out of molten metal. In one embodiment of the invention the electrodes (20) contacting the beryllium copper clip (50) are constructed of molybdenum and the electrodes (25) contacting the substrate (51) are constructed of chromium copper to limit the current through the weld circuit. When the weld cycle is initiated the projections (18) provide the highest resistance within the weld circuit. As the clip (50) and substrate (51) achieve intimate contact the molybdenum electrode (20) substantially provides a limiting, final resistance value within the weld circuit.

What is claimed is:

1. A method of welding a first metal to a substantially planar surface of a second metal wherein the first metal has a substantially higher melting point than the second metal and the first metal has a projection disposed thereon, the method having the steps of:

A) biasing the projection on the first metal into intimate contact with a portion of the substantially planar surface of the second metal creating an interface;

B) passing a controlled amount of electrical energy through the interface between the two metals thereby substantially liquifying a portion of the second metal; and, C) forcing the projection on the first metal into the second metal without substantial deformation of the projection.

2. The method as in claim 1 wherein the first metal is steel and the second metal is beryllium copper.

3. The method as in claim 2 wherein the steel has a plated copper covering of substantially three ten-thousandth inch thickness.

4. The method as in claim 3 wherein the plated copper covering has a electroless nickel phosphorus covering of substantially fifteen one-hundred-thousandth inch thickness.

5. The method as in claim 4 wherein the electroless nickel covering has a gold covering of substantially one one-hundred-thousandth inch thickness.

6. The method as in claim 2 wherein the beryllium copper has a plated copper covering of substantially two one-hundred-thousandth inch thickness.

7. The method as in claim 6 wherein the plated copper covering has a plated nickel covering of substantially seventy-five one-millionth inch thickness.

8. The method as in claim 7 wherein the plated nickel covering has a gold covering of substantially four one-hundred-thousandth inch thickness.

9. The method as in claim 7 wherein the platings on the second metal are substantially displaced by forcing the projection on the first metal into the second metal.

* * * * *